(12) United States Patent
Yarborough

(10) Patent No.: US 6,226,725 B1
(45) Date of Patent: May 1, 2001

(54) METHOD AND SYSTEM IN A DATA PROCESSING SYSTEM FOR THE DEDICATION OF MEMORY STORAGE LOCATIONS

(76) Inventor: Joel Mark Yarborough, 111 S. Knightsbridge Rd., Cary, NC (US) 27513

( * ) Notice: Subject to any disclaimer, the term of this patent is extended or adjusted under 35 U.S.C. 154(b) by 0 days.

(21) Appl. No.: 09/063,913

(22) Filed: Apr. 21, 1998

(51) Int. Cl.[7] .................................................. G06F 12/08
(52) U.S. Cl. .......................................... 711/170; 711/202
(58) Field of Search ..................................... 711/154, 202, 711/203, 170

(56) References Cited

U.S. PATENT DOCUMENTS

| | | | |
|---|---|---|---|
| 5,159,678 | 10/1992 | Wengelski et al. | 395/425 |
| 5,239,643 | * 8/1993 | Blount et al. | 707/102 |
| 5,375,084 | 12/1994 | Begun et al. | 365/63 |
| 5,557,740 | 9/1996 | Johnson et al. | 395/183.14 |
| 5,623,696 | 4/1997 | Johnson et al. | 395/681 |
| 5,629,880 | 5/1997 | Negishi | 364/579 |
| 5,659,798 | 8/1997 | Blumrich et al. | 395/846 |
| 5,675,790 | 10/1997 | Walls | 395/621 |
| 6,128,713 | * 10/2000 | Eisler et al. | 711/159 |

* cited by examiner

Primary Examiner—Kevin L. Ellis

(57) ABSTRACT

A method and system in a data processing system are disclosed for the dedication of memory storage locations. The data processing system includes a kernel space for executing software in kernel mode and a user space for executing software in user mode. An interface is established residing in the kernel space for interfacing between the kernel mode and the user mode. A determination is made that an application residing in user space is accessing the interface. In response to the application accessing the interface, a portion of main memory is dedicated for use by the application. The portion of main memory is used only by the application. In this manner, the application has dedicated the portion of main memory from user space.

14 Claims, 4 Drawing Sheets

METHOD AND SYSTEM IN A DATA PROCESSING SYSTEM FOR THE DEDICATION OF MEMORY STORAGE LOCATIONS

BACKGROUND OF THE INVENTION

1. Technical Field

The present invention relates to data processing systems and, in particular, to a data processing system having a user space for executing software in user mode and a kernel space for executing software in kernel mode, where the data processing system includes an interface between the user mode and the kernel mode such that an application residing in user space may access the interface. Still more particularly, the present invention relates to a method and system in a data processing system for dedicating a portion of main memory for use by an application residing in user space.

2. Description of the Related Art

Data processing systems typically include a computer which is capable of executing an operating system and user applications. The operating system is software that controls the execution of programs and that may provide services such as resource allocation, scheduling, input/output (I/O) control, and data management.

The operating system includes a kernel which is the part of the operating system which performs basic functions such as the allocation of hardware resources. Software executing in the kernel executes in kernel mode in the kernel space. Software code which executes in the kernel mode has direct access to memory, hardware, I/O, and memory management. Supervisory services are executed in kernel mode. Supervisory services control the execution of other routines. Supervisory services are also called executive services. These services are utilized to access hardware and to perform other services.

User applications do not execute in kernel mode. User applications execute in the user mode in user space. User applications use program interfaces to request system services. User applications have access to only their own address space. Software executing in user mode must use procedure calls in order to access other system resources. Software executing in user mode does not have direct access to memory, I/O, or memory management.

A user application will sometimes have critical file data which must be guaranteed fast access. The known methods for permitting a user application in user mode to access files do not provide guaranteed fast access.

Many modern computer systems include a virtual memory manager with demand paging used to juggle active data between main memory, which typically has fast access times, and disk storage, which typically has much slower access times. Active data may include executing code, data structures used by the executing code, and open files. Paging is required to support virtual memories and file sizes that exceed the physical memory in the computer.

A page fault occurs when a program attempts to read data from a memory page that has been swapped out to disk. Page faults are very expensive from a performance point of view.

Some modern computers also support the pinning of main memory from kernel space. When the memory is pinned, it is not paged and therefore, not subject to the performance degradation which occurs as a result of a page fault. In these systems, memory is pinned only from the kernel space. Typically, memory is pinned only when critical sections of code or data exist where page faults cannot be tolerated. Pinning memory dedicates main memory, thus preventing the rest of the system from using this portion of the main memory. In systems which permit pinning of memory, a particular size of the memory is dedicated for use. However, this section of memory is not dedicated for a particular purpose, or for use by a particular file or for particular data.

Pinning memory is typically an extreme step because of the high cost of memory and the dire consequences to the system if no memory is available. Therefore, pinning memory is done infrequently, and only in the kernel mode.

Therefore a need exists for a method and system in a data processing system for permitting software in a user mode to pin memory for a particular purpose.

SUMMARY OF THE INVENTION

It is therefore one object of the present invention to provide an improved data processing system.

It is another object of the present invention to provide a method and system in a data processing system having a user space for executing software in user mode and a kernel space for executing software in kernel mode, where the data processing system includes an interface between the user mode and the kernel mode such that an application residing in user space may access the interface.

It is yet another object of the present invention to provide a method and system in a data processing system for dedicating a portion of main memory for use by an application residing in user space.

The foregoing objects are achieved as is now described. A method and system in a data processing system are disclosed for the dedication of memory storage locations. The data processing system includes a kernel space for executing software in kernel mode and a user space for executing software in user mode. An interface is established residing in the kernel space for interfacing between the kernel mode and the user mode. A determination is made that an application residing in user space is accessing the interface. In response to the application accessing the interface, a portion of main memory is dedicated for use by the application. The portion of main memory is used only by the application. In this manner, the application has dedicated the portion of main memory from user space.

The above as well as additional objectives, features, and advantages of the present invention will become apparent in the following detailed written description.

BRIEF DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DETAILED DESCRIPTION OF A PREFERRED EMBODIMENT

A preferred embodiment of the present invention and its advantages are better understood by referring to FIGS. 1–4 of the drawings, like numerals being used for like and corresponding parts of the accompanying drawings.

Figure 1:
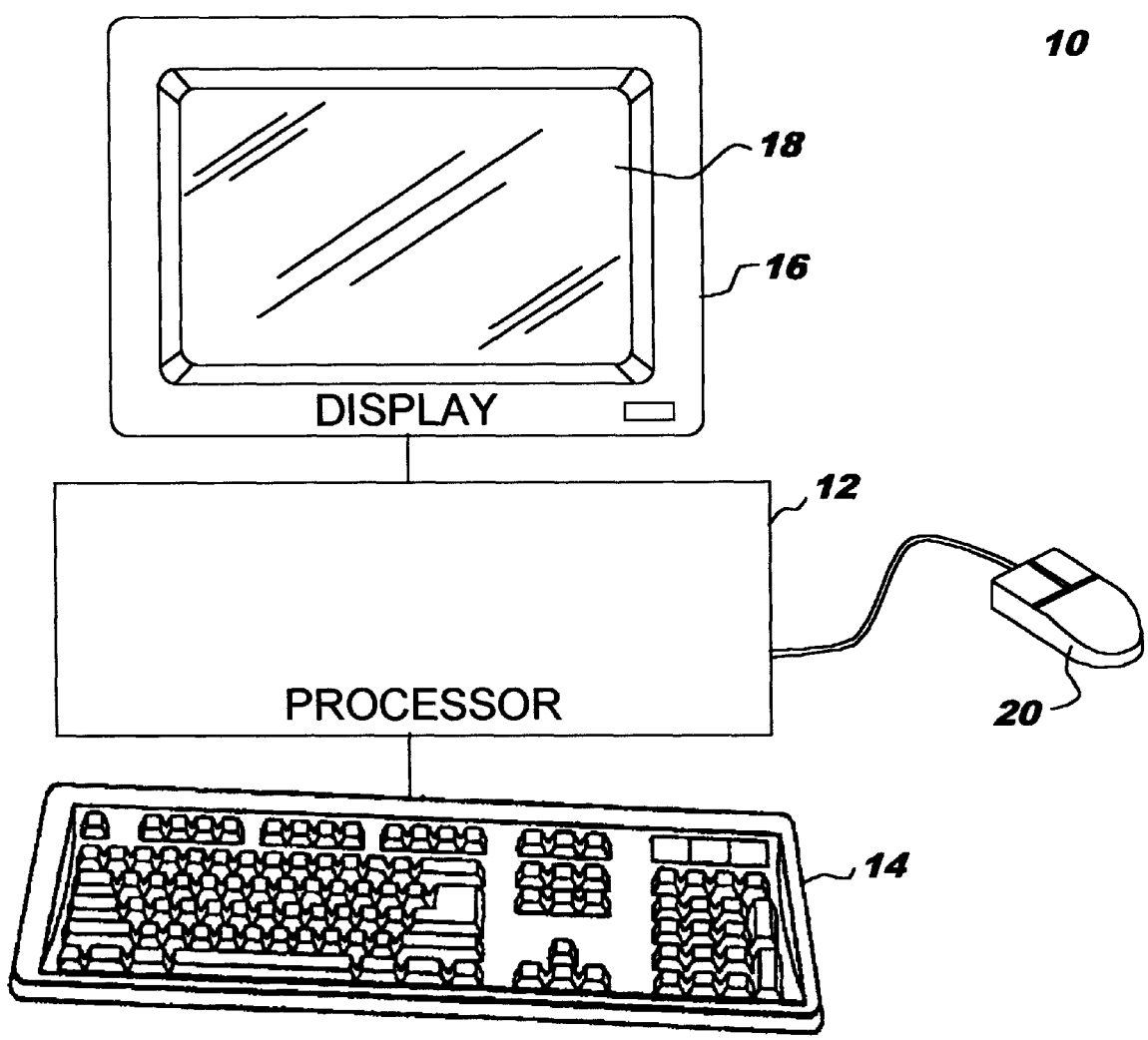
FIG. 1 depicts a pictorial representation of a data processing system embodying the present invention.

With reference now to the figures and in particular with reference to FIG. 1, there is depicted a pictorial representation of a data processing system 10 which may be utilized to implement the method and system of the present invention. Data processing system 10 includes a computer 12 which may be coupled to a monitor 16 having a display screen 18.

Computer 12 may be implemented utilizing any suitably configured personal computer, mini computer, mainframe computer, or a computer running in a network of other computers. Computer 12 has associated therewith a keyboard 14, and an input pointing device such as mouse 20. Those skilled in the art will appreciate that the input pointing device may be implemented utilizing a pointing stick, a mouse, a track ball, or a pen.

Figure 2:
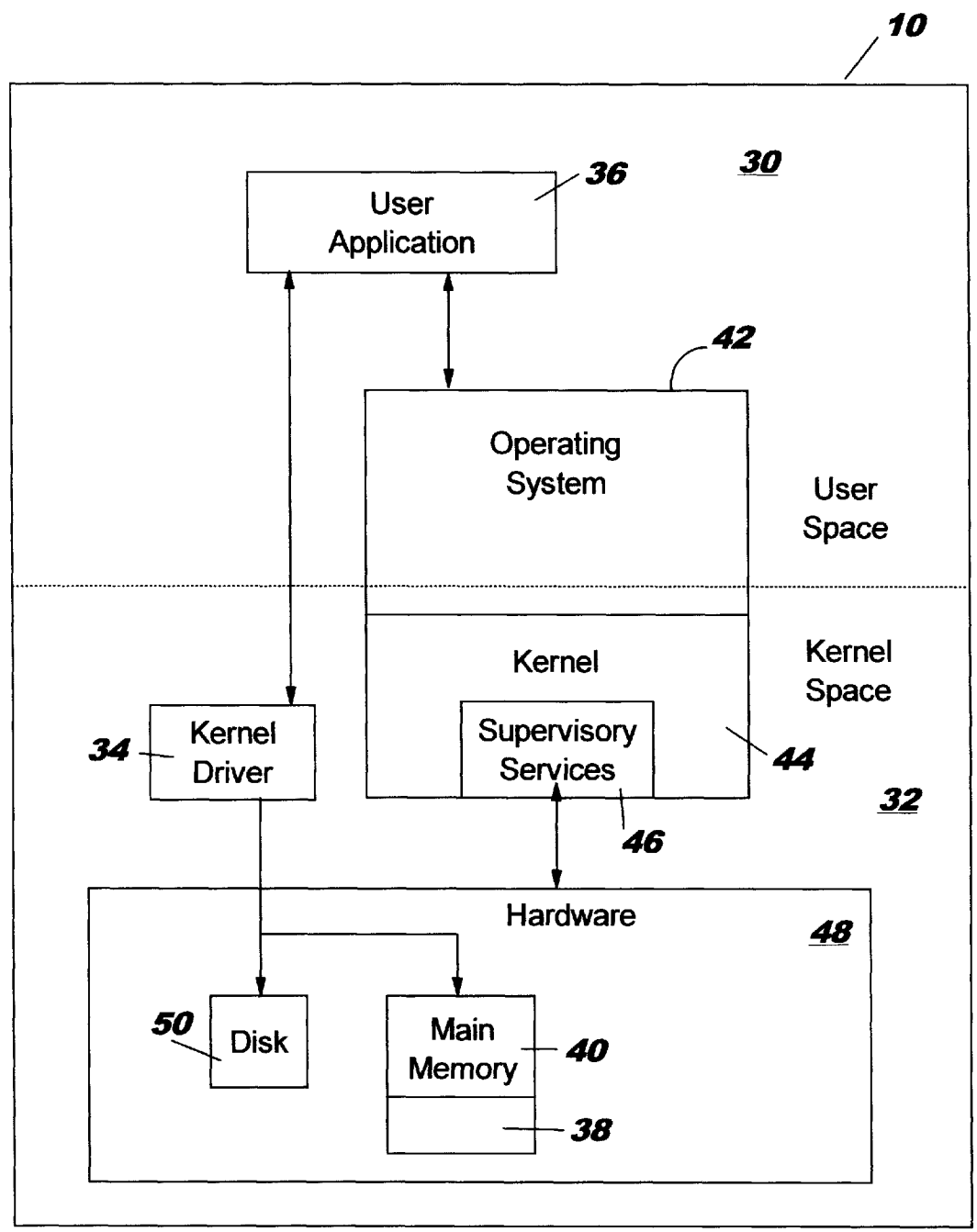
FIG. 2 illustrates a high-level block diagram of a user space for executing software in user mode, and a kernel space for executing software in kernel mode including a kernel driver which permits a user application to dedicate a portion of main memory in accordance with the method and system of the present invention.

FIG. 2 illustrates a high-level block diagram of a user space 30 for executing software in user mode, and a kernel space 32 for executing software in kernel mode including a kernel driver 34 which permits a user application 36 to dedicate a portion 38 of main memory 40 in accordance with the method and system of the present invention.

User space 30 and kernel space 32 exist within data processing system 10. User application 36 resides in user space 30 and accesses operating system 42 in order to be executed. Operating system 42 includes kernel 44 which in turn includes supervisory services 46. Supervisory services 46 is coupled to the various hardware 48 which is included within data processing system 10. Hardware 48 includes main memory 40 and disk 50. Hardware 48 may also include keyboard 14, monitor 16, mouse 20, computer 12, and any other devices coupled to data processing system 10 either internally to system 10 or externally. Supervisory services 46 operate to coordinate the use of the hardware resources and maintains the flow of processing unit operations.

Kernel 44 resides entirely in kernel space 32. A portion of operating system 42, typically most of operating system 42, resides in kernel space 32, and a portion of operating system 42 resides in user space 30. Operating system 42, kernel 44, and supervisory services 46 operate in accordance with the prior art.

In accordance with the present invention, user application 36 may access kernel interface 34 in order to have a portion 38 of main memory 40 dedicated to user application 36. A new procedure call must be inserted into user application 36 in order to permit user application 36 to access kernel driver 34. No other modification need be made to user application 36 in order to pin portion 38 of main memory 40.

The new procedure call will preferably specify the file or data to be pinned in portion 38 of main memory 40. User application 36, with the exception of the new call, will operate normally with operating system 42 and kernel 44.

When kernel driver 34 is accessed utilizing the new procedure call, kernel driver 34 will determine which file, data, or other resource is to be pinned in portion 38 of memory 40. Kernel driver 34 then determines the size of the file or resource to pin. Kernel driver 34 will also determine whether pinning memory of this size will cause data processing system 10 to crash or have its performance to otherwise be significantly degraded.

If kernel driver 34 determines that data processing system 10 will not crash or have its performance significantly degraded, kernel driver 34 will dynamically select specific locations, called portion 38, within main memory 40 to pin. Kernel driver 34 will then use kernel interfaces and supervisory services 46 to force the entire file into portion 38 and pin it. Thereafter, user application 36 will continue executing using normal processing. User application 36 will use standard file I/O routines for processing. Portion 38 is released by kernel driver 34 when it no longer needs to be pinned.

In this manner, user application 36 is capable of pinning memory from user space 30. In known prior art systems, memory was capable of being pinned only from kernel space 32. In addition, the present invention permits pinning of a particular file. Portion 38 of memory 40 is pinned for use by only a particular file specified by the procedure call which called kernel driver 34. Other files which might need pinning are not permitted to utilize portion 38 when it is pinned for use by the file specified by application 36.

Figure 3:
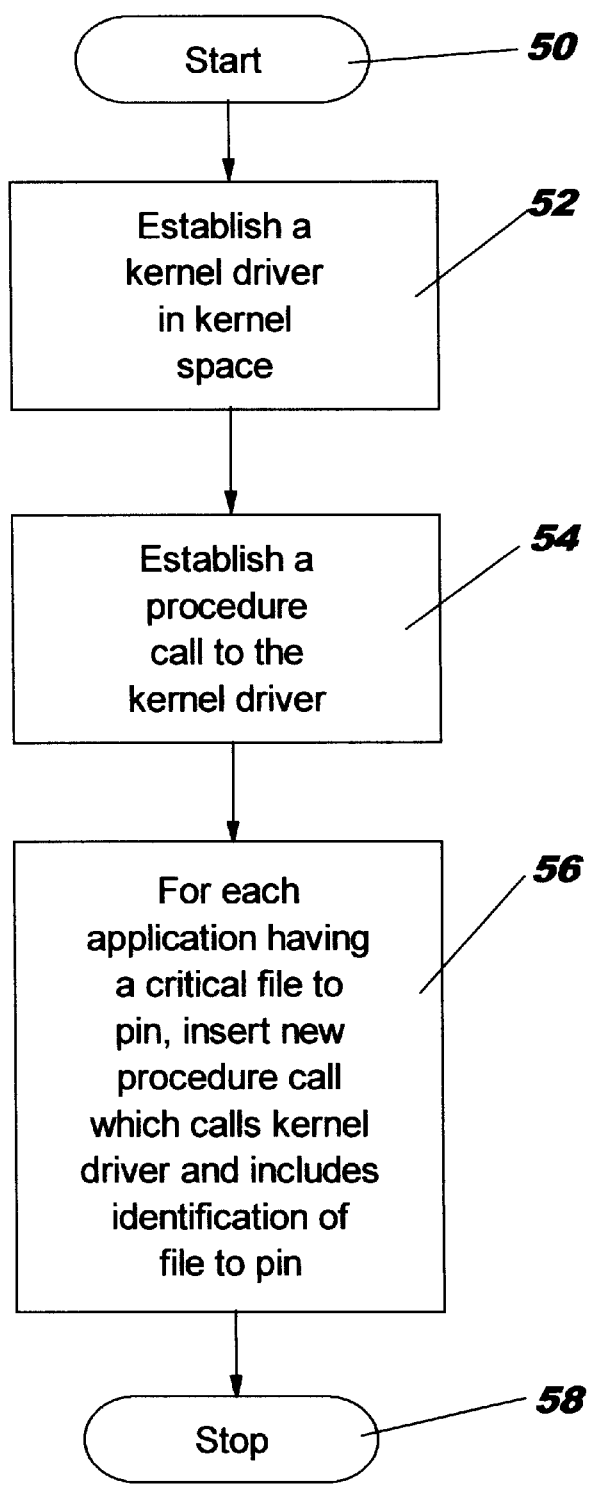
FIG. 3 is a high-level flow chart illustrating the establishment of a kernel driver and a procedure call to the kernel driver in accordance with the method and system of the present invention.

FIG. 3 is a high-level flow chart illustrating the establishment of a kernel driver and a procedure call to the kernel driver in accordance with the method and system of the present invention. The process starts as depicted at block 50 and thereafter passes to block 52 which illustrates the establishment of a kernel driver in kernel space. Next, block 54 depicts the establishment of a procedure call to the kernel driver. The procedure call is the only necessary modification to a user application in order to access the kernel driver and perform the method of the present invention. The process then passes to block 56 which illustrates inserting a procedure call into each user application having a critical file which needs to be pinned into memory. The procedure call calls the kernel driver and includes an identification of the file to pin. Those skilled in the art will recognize that other resources, such as specified data, may also be pinned. The process then terminates as depicted at block 58.

Figure 4:
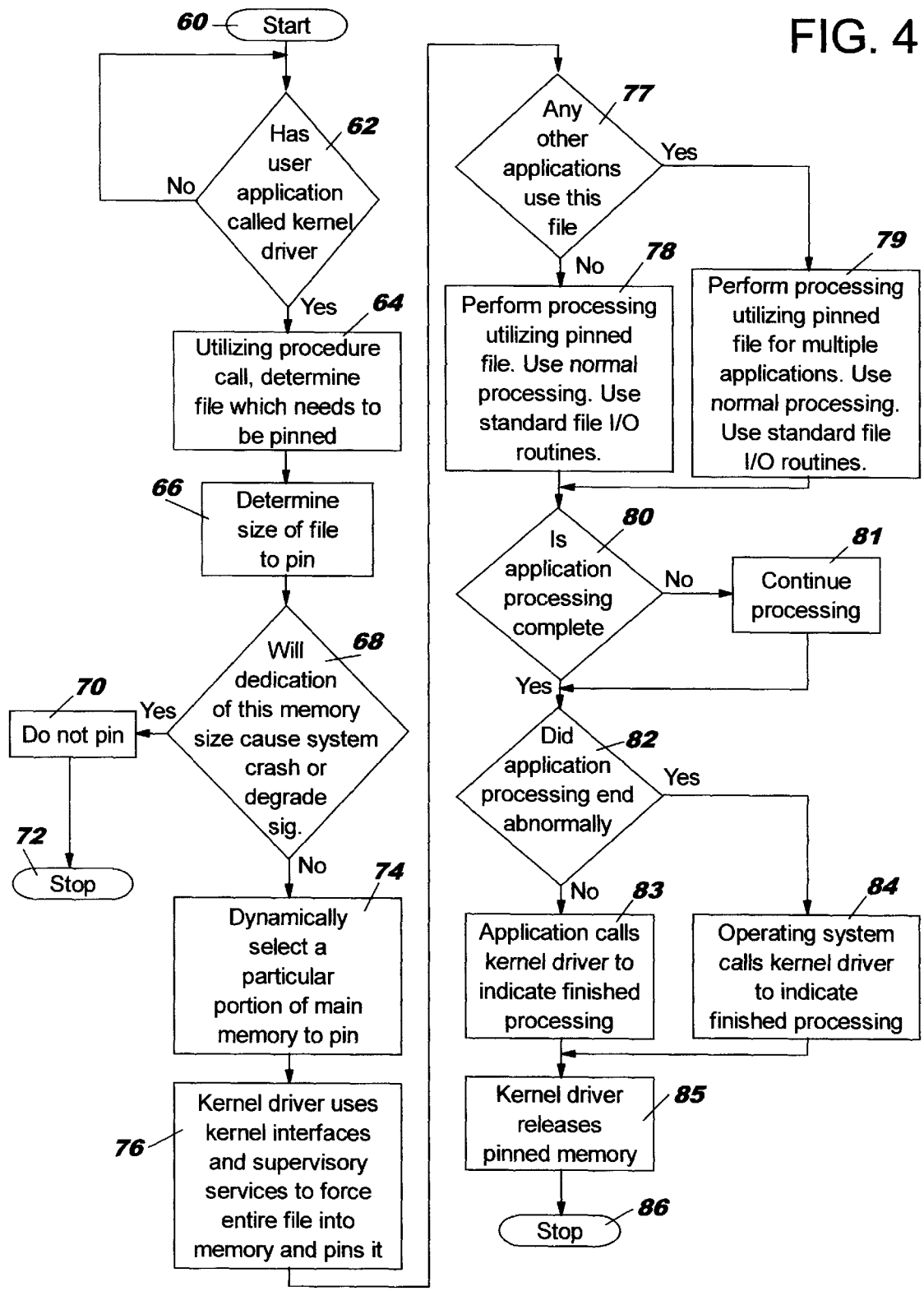
FIG. 4 is a high-level flow chart depicting the accessing of a kernel driver by a user application to permit the user application to dedicate a portion of main memory in accordance with the method and system of the present invention.

FIG. 4 is a high-level flow chart depicting the accessing of a kernel driver by a user application to permit the user application to dedicate a portion of main memory in accordance with the method and system of the present invention. The process starts as illustrated at block 60 and thereafter passes to block 62 which depicts a determination of whether or not a user application has called the kernel driver utilizing the established procedure call. If a determination is made that no user application has called the kernel driver, the process passes back to block 62. If a determination is made that a user application has called the kernel driver, the process passes to block 64 which illustrates the utilization of the procedure call to determine which file needs to be pinned.

Next, block 66 depicts a determination of the size of the file to pin. Thereafter, block 68 illustrates a determination of whether or not the dedication of memory this size will cause the data processing to crash or otherwise degrade the performance significantly. If a determination is made that dedication of memory this size will cause the data processing to crash or otherwise degrade the performance significantly, the process passes to block 70 which depicts the prohibition of the pinning of the memory. Thereafter, the process terminates as illustrated by block 72.

Referring again to block 68, if a determination is made that dedication of memory this size will not cause the data processing system to crash or otherwise degrade the performance significantly, the process passes to block 74 which depicts the dynamic selection of a particular portion of main memory to utilize for pinning. Next, block 76 illustrates the kernel driver using kernel interfaces and supervisory services to force the entire file into memory and pinning it.

The process then passes to block 77 which illustrates a determination of whether or not any other applications need to access the pinned file. Multiple processes could share the same file. For example, eight applications on a server may need to access a common file of important data. In this case, the first application needing to access the file will cause the file to be pinned. Thereafter, the other applications may also access the file which has been pinned by the first application. If a determination is made that no other applications also need to access this file, the process passes to block 78 which depicts the processing of the user application utilizing normal processing and utilizing the pinned file. Standard file I/O routines are used. The process then passes to block 80.

Referring again to block 77, if a determination is made that other applications need to access this file, the process passes to block 79 which depicts the processing of the multiple user applications utilizing normal processing and utilizing the pinned file. Standard file I/O routines are used. The process then passes to block 80.

Block 80 illustrates a determination of whether or not the processing of the user application is complete. If a determination is made that the processing of the user application is not complete, the process to block 81 which depicts the continuation of the processing. The process then passes to block 82. Referring again to block 80, if a determination is made that the processing of the user application is complete, the process passes to block 82 which depicts a determination of whether or not the application processing ended abnormally. If a determination is made that the processing ended normally, the process passes to block 83 which depicts the application calling the kernel driver to indicate that the user application has finished processing. The process then passes to block 85.

Referring again to block 82, if a determination is made that the processing ended abnormally, the process passes to block 84 which illustrates the operating system calling the kernel driver to indicate that the application has finished processing. If an application pins a file and then crashes, it will never be able to directly tell the kernel to unpin the file. Therefore, the kernel driver must be notified by the operating system, instead of the application, to unpin the file. The process then passes to block 85.

Block 85 illustrates the kernel driver releasing the pinned memory for use now by the rest of the data processing system. The process then terminates as illustrated at block 86.

While a preferred embodiment has been particularly shown and described, it will be understood by those skilled in the art that various changes in form and detail may be made therein without departing from the spirit and scope of the present invention.

What is claimed is:

1. A method in a data processing system having a kernel space for executing software in kernel mode and a user space for executing software in user mode, said method comprising:

establishing an interface residing in said kernel space for interfacing between said kernel mode and said user mode;

determining an application residing in said user space accessing said interface;

in response to said application accessing said interface, dedicating a portion of physical memory for use by a file which is accessed by said application, wherein said portion of physical memory is used only by said application, and further wherein said application has dedicated said portion of physical memory from said user space; and determining if dedication of said portion of the physical memory will cause a performance of said data processing system to be significantly degraded.

2. The method according to claim 1, wherein the step of dedicating a portion of physical memory for use by only a file which is accessed by said application further comprises the step of storing said file in said portion of physical memory for later use by said application, wherein said portion of physical memory is not used for any other purpose.

3. The method according to claim 1, further comprising the step of in response to a determination that dedication of said portion of physical memory will cause a performance of said data processing system to be significantly degraded, prohibiting said portion of physical memory from being dedicated.

4. The method according to claim 1, further comprising the step of establishing a procedure call to be utilized by said application for permitting said application to access said interface.

5. The method according to claim 4, wherein said step of determining said application accessing said interface further comprises the step of determining said application accessing said interface utilizing said procedure call.

6. A data processing system having a kernel space for executing software in kernel mode and a user space for executing software in user mode, comprising:

means for establishing an interface residing in said kernel space for interfacing between said kernel mode and said user mode;

means for determining an application residing in said user space accessing said interface;

means responsive to said application accessing said interface, for dedicating a portion of physical memory for use by said application, wherein said portion of physical memory is used only by said application, and further wherein said application has dedicated said portion of physical memory from said user space; and means for determining if dedication of said portion of said physical memory will cause a performance of said data processing system to be significantly degraded.

7. The system according to claim 6, wherein said means for dedicating a portion of physical memory for use by only a file which is accessed by said application further comprises means for storing said file in said portion of physical memory for later use by said application, wherein said portion of physical memory is not used for any other purpose.

8. The system according to claim 6, further comprising means responsive to a determination that dedication of said portion of physical memory will cause a performance of said data processing system to be significantly degraded, for prohibiting said portion of physical memory from being dedicated.

9. The system according to claim 6, further comprising means for establishing a procedure call to be utilized by said application for permitting said application to access said interface.

10. The system according to claim 9, wherein said means for determining said application accessing said interface further comprises means for determining said application accessing said interface utilizing said procedure call.

11. A method in a data processing system having a kernel space for executing software in kernel mode and a user space for executing software in user mode, said method comprising:

- establishing an interface residing in said kernel space for interfacing between said kernel mode and said user mode;
- determining an application residing in said user space accessing said interface;
- in response to said application accessing said interface, dedicating a portion of main memory for use by said application, wherein said portion of main memory is used only by said application, and further wherein said application has dedicated said portion of main memory from said user space;
- establishing a procedure call to be utilized by said application for permitting said application to access said interface;
- wherein the step of determining said application accessing said interface further comprises the step of determining said application accessing said interface utilizing said procedure call;
- wherein the step of dedicating a portion of main memory for use by said application further comprises the step of dedicating a portion of main memory for use by said application for a particular purpose;
- wherein the step of dedicating a portion of main memory for use by said application for a particular purpose further comprises the step of dedicating a portion of main memory for use by only a file which is accessed by said application;
- wherein the step of dedicating a portion of main memory for use by only a file which is accessed by said application further comprises the step of storing said file in said portion of main memory for later use by said application, wherein said portion of main memory is not used for any other purpose; and
- determining if dedication of said portion of main memory for storing said file will cause a performance of said data processing system to be significantly degraded.

12. The method according to claim 11, further comprising the step of in response to a determination that dedication of said portion of main memory to storing said file will cause a performance of said data processing system to be significantly degraded, prohibiting said portion of main memory from being dedicated to storing said file.

13. A data processing system having a kernel space for executing software in kernel mode and a user space for executing software in user mode, comprising:

- means for establishing an interface residing in said kernel space for interfacing between said kernel mode and said user mode;
- means for determining an application residing in said user space accessing said interface;
- means responsive to said application accessing said interface, for dedicating a portion of main memory for use by said application, wherein said portion of main memory is used only by said application, and further wherein said application has dedicated said portion of main memory from said user space;
- means for establishing a procedure call to be utilized by said application for permitting said application to access said interface;
- wherein said means for determining said application accessing said interface further comprises means for determining said application accessing said interface utilizing said procedure call;
- wherein said means for dedicating a portion of main memory for use by said application further comprises means for dedicating a portion of main memory for use by said application for a particular purpose;
- wherein said means for dedicating a portion of main memory for use by said application for a particular purpose further comprises means for dedicating a portion of main memory for use by only a file which is accessed by said application;
- wherein said means for dedicating a portion of main memory for use by only a file which is accessed by said application further comprises means for storing said file in said portion of main memory for later use by said application, wherein said portion of main memory is not used for any other purpose; and
- means for determining if dedication of said portion of main memory for storing said file will cause a performance of said data processing system to be significantly degraded.

14. The system according to claim 13, further comprising means responsive to a determination that dedication of said portion of main memory to storing said file will cause a performance of said data processing system to be significantly degraded, for prohibiting said portion of main memory from being dedicated to storing said file.

* * * * *

UNITED STATES PATENT AND TRADEMARK OFFICE
CERTIFICATE OF CORRECTION

PATENT NO. : 6,226,725 B1
DATED : May 1, 2001
INVENTOR(S) : Joel Mark Yarborough It is certified that error appears in the above-identified patent and that said Letters Patent is hereby corrected as shown below:

Title page,
Item [73], Assignee, insert -- International Business Machines Corporation; Armonk, NY --.
Item [74], *Attorney, Agent or Firm*, insert -- John D. Flynn, and Felsman, Bradley, Vaden, Gunter & Dillon, LLP --.

Signed and Sealed this

Thirteenth Day of April, 2004

JON W. DUDAS
*Acting Director of the United States Patent and Trademark Office*